US008521832B1

(12) United States Patent
Whittaker et al.

(10) Patent No.: US 8,521,832 B1
(45) Date of Patent: Aug. 27, 2013

(54) MOBILE MONETIZATION

(75) Inventors: Thomas Edward Whittaker, Wanda, MN (US); Zhaowei Charlie Jiang, Palo Alto, CA (US); Cynthia Chichia Wang, Mountain View, CA (US); Russell Alexander Beattie, Menlo Park, CA (US); Robert Carter Trout, Menlo Park, CA (US)

(73) Assignee: Yahoo! Inc., Sunnyvale, CA (US)

( * ) Notice: Subject to any disclaimer, the term of this patent is extended or adjusted under 35 U.S.C. 154(b) by 785 days.

(21) Appl. No.: 11/538,780

(22) Filed: Oct. 4, 2006

(51) Int. Cl.
*G06F 15/16* (2006.01)

(52) U.S. Cl.
USPC .......... 709/217; 709/219; 709/231; 705/14.4; 705/14.49

(58) Field of Classification Search
USPC ...................................... 709/217–219; 705/1
See application file for complete search history.

(56) References Cited

U.S. PATENT DOCUMENTS

| 8,175,921 | B1 | 5/2012 | Kopra |
| 2002/0169540 | A1 | 11/2002 | Engstrom |
| 2003/0005056 | A1 | 1/2003 | Yamamoto et al. |
| 2003/0076344 | A1 | 4/2003 | Chatani et al. |
| 2003/0216930 | A1* | 11/2003 | Dunham et al. ................. 705/1 |
| 2004/0107136 | A1 | 6/2004 | Nemirofsky et al. |
| 2004/0186776 | A1* | 9/2004 | Llach .............................. 705/14 |
| 2004/0204997 | A1 | 10/2004 | Blaser et al. |
| 2006/0212350 | A1* | 9/2006 | Ellis et al. ....................... 705/14 |
| 2006/0212897 | A1 | 9/2006 | Li et al. |

FOREIGN PATENT DOCUMENTS

| CN | 1270475 A | 10/2000 |
| CN | 1395390 | 2/2003 |
| CN | 1478241 | 2/2004 |
| CN | 1571950 | 1/2005 |
| JP | 2006-195942 A | 7/2006 |
| KR | 10-2006-0021485 | 3/2006 |
| KR | 10-2006-0082219 | 7/2006 |
| WO | 03075547 | 9/2003 |
| WO | 2006076424 A2 | 7/2006 |

OTHER PUBLICATIONS

"Captcha," (Mar. 12, 2006). In Wikipedia, The Free Encyclopedia, 07:41 UTC. Wilkimedia Foundation, Inc. accessed Feb. 26, 2007, http://en,wikipedia.org/w/index.php?title=Captcha&oldid=43407448. (8 pgs).
"Turing test," (Feb. 20, 2007). In Wikipedia, The Free Encyclopedia. 12:23 UTC. Wikimedia Foundation, Inc. (accessed Feb. 26, 2007). http://en.wikipedia.org/w/index.php?title=Turing_test&oldid=109540488. (7 pgs).
Sybase Performance and Tuning: Locking, Adaptive Server Enterprise 12.5.1, Chapter 7 How Indexes Work, Aug. 2003, p. 125-126. (4 pgs).
Passani, L., "What's the WURFL?" (accessed Oct. 24, 2007)http://wurfl.sourceforge.net. (2 pgs).

(Continued)

*Primary Examiner* — Ian N Moore
*Assistant Examiner* — Jackie Zuniga

(57) ABSTRACT

A device, system, and method are directed towards facilitating monetization of mobile devices. A click action server determines click actions that are to be sent to a client device based on one or more factors. The click actions are sent to the client device as links. An action handler receives requests indicating a selected action, and facilitates the performance of the action.

19 Claims, 9 Drawing Sheets

(56) References Cited

OTHER PUBLICATIONS

Passani, L., "Welcome to the WURFL, the Wireless Universal Resource File," (accessed Oct. 24, 2007) http://wurfl.sourceforge.net. (2 pgs).
Official Communication for Chinese Patent Application No. 200780037485.X mailed Sep. 28, 2012.
International Search Report and Written Opinion for International Patent Application No. PCT/US2007/070137 mailed Nov. 19, 2007.
Official Communication for Korean Patent Application No. 10-2009-7008424 mailed Feb. 10, 2011.
Official Communication for Korean Patent Application No. 10-2009-7008424 mailed Jan. 29, 2012.
Official Communication for Chinese Patent Application No. 200780037485.X mailed Sep. 26, 2011.
Official Communication for Japanese Patent Application No. 2009-531496 mailed May 16, 2011.
Official Communication for Japanese Patent Application No. 2009-531496 mailed Apr. 16, 2012.

* cited by examiner

MOBILE MONETIZATION

FIELD OF THE INVENTION

The present invention relates generally to client computing devices and, more particularly, but not exclusively to monetizing mobile clients.

BACKGROUND OF THE INVENTION

Advertisements delivered over the Internet provide a large amount of revenue for business. Web pages often have banner ads included on the page. Banner ads may be in various forms, including static text or images, animations, audio, and videos. Typically, banner ads have a visual component on a page and one or more associated links. When a user clicks on a link, a corresponding URL is used to retrieve a web page related to the advertiser. Often, this is a home page or other page of the advertiser's web site. From there, the user can browse the web site.

Application ads are typically returned by a network application in response to a user interacting with the application. A sponsored search ad is an application ad produced by a search application. Sponsored search ads, or simply "search ads" are typically returned by a web server in response to a user performing a search. One or more of the keywords sent in the search request may be used to select search ads to be returned with the search results. Search ads may appear similar to the actual search results and be integrated with the search results. They may also appear in a separate section of a search results page. They may appear and have the attributes of a banner ad, such as having associated links as discussed above. As used herein, the terms "ad" or "advertisement" may refer to a search ad, a banner ad, or another type of advertisement. Another example of an application ad is one produced by a mapping application. The ad may be integrated with a map, or directions sent to the user.

Mobile devices have different characteristics from non-mobile devices. They typically have smaller display screens. They may have different input mechanisms, or have other capabilities that differ from non-mobile devices, such as capabilities of initiating telephone calls, sending and receiving SMS messages, providing location information, and the like. A user interacting with a mobile device may have different needs or interests than a user of a non-mobile device. Also, many advertisers do not have mobile web sites, or web sites that can be easily viewed and navigated from a mobile device. It is important for advertisers and web content providers to have effective ways of advertising across the Internet. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

Figure 1:
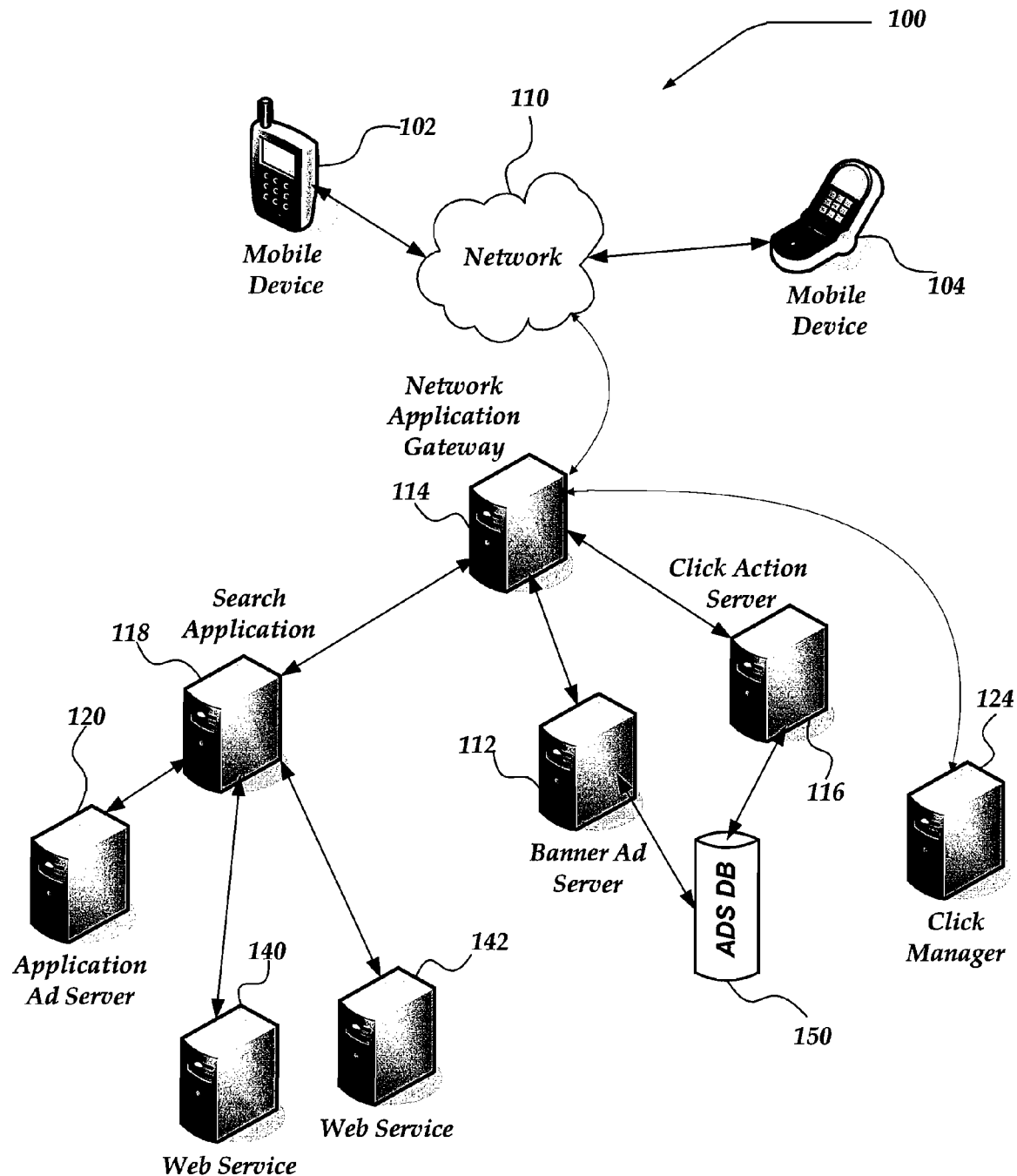
FIG. 1 is a system diagram of one embodiment of an environment in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "receiving" an item, such as a request, response, or other message, from a device or component includes receiving the message indirectly, such as when forwarded by one or more other devices or components. Similarly, "sending" an item to a device or component includes sending the item indirectly, such as when forwarded by one or more other devices or components.

As used herein, the term "mobile identification number" (MIN) refers to a number that uniquely identifies a mobile device within a mobile carrier's network. A cellular telephone's phone number may be used as an MIN.

As used herein, the term "client application" refers to an application that runs on a client computing device. A client application may be written in one or more of a variety of languages, such as 'C', 'C++', 'J2ME', 'Brew'', Java, and the like. Browsers, email clients, text messaging clients, calendars, and games are examples of client applications. A mobile client application refers to a client application that runs on a mobile device.

As used herein, the term "network application" refers to a computer-based application that communicates, directly or indirectly, with at least one other component across a network. Web sites, email servers, messaging servers, and game servers are examples of network applications.

As used herein, the term "uniform resource identifier" (URI) refers to an identifier used to identify an abstract or physical resource. The term URI includes uniform resource locators (URL) and uniform resource names (URN). RFC 3986 describes a syntax for a URI. As used herein, the term URI is not limited to this syntax, and may include other syntaxes.

Briefly stated the present invention is directed towards the monetization of mobile web users by providing mechanisms that determine and present users with actions that most effectively achieve a goal of producing business transactions. The invention incorporates knowledge of mobile devices, mobile device, user behavior, contexts of interactions with a mobile device user, and information from advertisers, as well as other information, into processes that select effective mechanisms for monetization, and determine action choices to present to the user. The system and methods of the invention facilitate determining the content of advertisements, web pages, or other content to send to a client device, including a determination of action choices that may be sent to the client device and presented to the user. The system and methods of the invention further facilitate processing selections of actions by the user and performing the selected action. The system and methods of the invention further provide an advertiser with mechanisms for communicating, interacting, or performing transactions, with users of mobile devices, without requiring the advertiser to employ a mobile web site. The present invention provides an advertiser with one or more ways of communicating with a user of a client device, such as a mobile device. These communication mechanisms include, but are not limited to, telephonic communication, SMS messaging, IM messaging, and web-based responses. The invention further provides an advertiser with one or more additional actions that may be presented to the client device user. These actions include, but are not limited to, performing a purchase transaction, performing a search, saving information, and requesting information.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes client devices, in particular mobile devices 102-104. The system also includes network 110, network application gateway 114, banner ad server 112, ADS database 150, search application 118, application ad server 120, click action server 116, and web services 140-142.

A variety of client devices may be employed in accordance with the invention. The client devices may include mobile devices, digital home clients such as personal computers and media centers, and other client devices. One embodiment of mobile devices 102-104 is described in more detail below in conjunction with FIG. 2. Generally, however, mobile devices 102-104 may include virtually any portable computing device capable of receiving and sending a message over a network, such as network 110, or the like. Mobile devices 102-104 may also be described generally as client devices that are configured to be portable. Mobile devices 102-104 may have the capability of connecting to a network using wireless technology, wired connections, or a combination of both wired and wireless connections. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, another cell phone or web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, video, multimedia, and the like, employing virtually any web based language or protocol, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 may include one or more other client applications that are configured to receive content from another computing device. The client application may include a capability to provide and receive textual content, graphical content, audio content, video content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to network application gateway 114, click action server 116, or other computing devices.

Mobile devices 102-104 may also be configured to communicate a message, such as through Short Message Service (SMS), Multimedia Message Service (MMS), instant messaging (IM), interne relay chat (IRC), Mardam-Bey's IRC (mIRC), Jabber, and the like, between another computing device, such as network application gateway 114, click action server 116, or the like. However, the present invention is not limited to these message protocols, and virtually any other message protocol may be employed.

Mobile devices 102-104 may be further configured to enable a user to participate in communications sessions, such as IM sessions. As such, mobile devices 102-104 may include a client application that is configured to manage various actions on behalf of the client device. For example, the client application may enable a user to interact with the browser application, email application, IM applications, SMS application, and the like.

Mobile devices 102-104 may further be configured to include a client application that enables the end-user to log into an end-user account that may be managed by a network application. Such an end-user account, for example, may be configured to enable the end-user to receive emails, send/receive IM messages, SMS messages, access selected web pages, participate in a social networking activity, maintain a digital wallet, or the like.

Network 110 is configured to couple mobile devices 102-104, as well as other client devices not illustrated, and their components, with other network devices, such as network application gateway 114, click action server 116, and the like. Network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like. Additionally, network 110 may connect to mobile devices with a wired connection, such as cable, phone lines, Ethernet wires, and the like. The invention may be used either generally with networks, specifically with wireless networks, or with various combinations of wireless and wired networks.

Network 110 may further include an autonomous system of terminals, gateways, routers, and the like connected by wireless radio links, and the like. These connectors may be configured to move freely and randomly and organize themselves arbitrarily, such that the topology of network 110 may change rapidly.

Network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, network 110 may include virtually any communication mechanism by which information may travel between mobile devices 102-104 and another computing device, network, and the like.

Network 110 may further include or employ one or more network gateways (not shown) that serve as intermediaries between mobile devices 102-104 and other network devices, such as network application gateway 114, and click action server 116. A network gateway may receive data from a device or network, transform the data, and forward the data to another device or network. A network gateway may perform a transformation in more than one direction. Transformation may, for example, include modifying protocols or communications mechanisms in order to facilitate communication between two devices or two networks, each of which may employ differing protocols. A WAP gateway is one type of network gateway. A WAP gateway may facilitate communication between a first device that uses the Wireless Application Protocol (WAP), and a second device. The second device may, for example, communicate using the HyperText Transfer Protocol (HTTP). An SMS gateway is a network gateway that facilitates communication between a device using the Short Message Service (SMS) protocol and another device, such as one using HTTP. A WAP and SMS gateway combines the features of a WAP gateway and an SMS gateway.

A network application gateway 114 may serve as a gateway between a network gateway and a network application. It may perform transformations of data or protocols in one or more directions, add content being sent to a client device, or perform one or more other functions to facilitate communications with a client device. An example of a network application gateway is disclosed in copending U.S. patent application Ser. No. 11/537,447 titled "SYSTEM AND METHOD FOR MANAGING CONTENT FOR REMOTE CLIENT DEVICES" and filed on Sep. 29, 2006, which is incorporated herein by reference.

FIG. 1 shows mobile devices 102-104 communicating with network application gateway 114, and network application gateway 114 communicating with banner ad server 112, click action server 116, and search application 118. FIG. 1 also shows search application 118 communicating with application ad server 120 and web services 140-142. FIG. 1 further shows click action server 116 communicating with ADS database 150. Each of these communications may employ a direct connection, or one or more networks, or a combination thereof.

A network enabling any one or more of the above communications may employ any form of computer readable media for communicating information from one electronic device to another. Also, the network can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, the network includes any communication method by which information may travel between network application gateway 114, banner ad server 112, search application 118, application ad server 120, web services 140-142, click action server 116, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Though FIG. 1 illustrates an embodiment of a system having each of network application gateway 114, banner ad server 112, click action server 116, search application 118, application ad server 120, and web services 140-142 as separate computing devices, the invention is not so limited. Software, hardware, or hardware-software combinations implementing any portion of these components can be combined with any other component on a single computing device, or arranged in a different manner among multiple computing devices. Some portion or all of the functionality of any component may be distributed or duplicated among multiple computing devices. In particular, in one embodiment, the click action server 116, or a portion thereof, is implemented as one or more software components in the network application gateway 114. In one embodiment, at least some of the functionality of banner ad server 112 and application ad server 120 may be combined into a single computing device. ADS database 150 may reside on banner ad server 112, on a separate computing device, or may be distributed across multiple computing devices.

One embodiment of a network device that may be used to implement any one or more of network application gateway 114, banner ad server 112, click action server 116, search application 118, application ad server 120, or web services 140-142 is described in more detail below in conjunction with FIG. 3. Briefly, however, such network devices may include any computing device capable of communicating with other network devices to enable network applications or web sites to process and respond to requests from client devices, such as mobile devices 102-104. Devices that may operate as these network devices include personal computers desktop computers, multiprocessor systems, microprocessor-based or programmable consumer electronics, network PCs, servers, and the like, or any combination thereof.

FIG. 1 illustrates an embodiment of a system having two ad servers: a banner ad server 112, which communicates with a network application gateway 114, and an application ad server 120, which communicates with search application 118. Briefly, an ad server provides advertisements, which may be banner ads, application ads, such as search ads, or other types of advertisements. An application advertisement is an advertisement that is associated with an interaction with an application. It is typically integrated with the application presentation in some way. A search ad is an example of an application ad. When a search is performed, a search application may select one or more ads based on the keywords of the search. The search application may combine search ads with the search results, and present them in an integrated manner. In some embodiments, the integration may be so complete that there is not a clear distinction between the search ads and the search results. In some embodiments, one or more ways of indicating the search ads may be included, such as text, color, line separators, and the like. Similarly, other applications may generate application ads. A mapping application, for example, may use the location specification in a request to generate advertisements based on the location, such as those of businesses in the area, and may display an advertisement on the map.

A banner advertisement typically is placed in a location that is separate from, or more distinguishable from, an application's results. For example, it may be at the top or bottom of a page, or along the margin. A banner advertisement may be selected based on criteria similar to those for an application ad, based on different criteria, or randomly selected.

Banner ad server 112 may have an associated ADS database 150, which may be integrated or in communication with banner ad server 112. ADS database 150 stores data pertaining to advertisement contents, constraints, and rules pertaining to the use of each advertisement. It may also store information that is used when actions are performed in response to receiving an advertisement. At least a portion of the data stored in banner ad server 112 may be specified by an advertiser. An advertiser may specify data describing the contents of ads to be served, click actions that may be presented to a client device, specifications relating to criteria to be used when determining a click action to be displayed, and the like. The specifications may include a monetization value for each click action. A monetization value represents the value to the advertiser of the user selecting the click action. This value may incorporate a probability that a user will perform a purchase or other transaction. It may also incorporate an amount of revenue that may result from selecting the click action. An advertiser may also specify content that is to be delivered to a client device when a corresponding click action is selected. This may include the content of an SMS message, an email, or a web page. It may also include a telephone number to be called, or an address to send an SMS message or email. The advertiser may further provide data upon which searches are performed, such as a list of retail stores and their locations.

Banner ad server 112 may receive data or a set of parameters to use for selecting and generating an advertisement, including data upon which various determinations are made. Selecting and generating an advertisement may include selecting an advertiser, selecting an advertisement associated with the advertiser, or selecting content to include in an advertisement. The data upon which these and other determinations may be based may include information about the user or mobile device, actions that the user or mobile device have taken, information pertaining to current activity, data pertaining to one or more advertisers, relevant events, and a variety of other types of information.

Click action server 116 implements processes to select optimal click actions to make available to a mobile device user. It may receive data or a set of parameters to use in the selection process. The data upon which these and other determinations may be based may include information about the user or mobile device, actions that the user or mobile device have taken, information pertaining to current activity, data pertaining to one or more advertisers, relevant events, and a variety of other types of information. Physical location and movement are examples of this data. The click action server 116 may select a click action to present based on the location of a mobile device, the direction that it is or has been moving, or the speed of movement. These factors and the processes of selecting click actions is discussed in further detail below, and illustrated in FIG. 5.

Search application 118 is an application that performs searches. This may include searching the World Wide Web or portion thereof, searching news items, searching a database, searching a catalogue, or any of a number of types of searches. Generally, some criteria or constraints are used to specify a search, such as one or more keywords, types of items to be retrieved, locations to search, or various other specifications. A search application may retrieve a set of results, generate a results page, and send the results to the requester. As discussed above, a search application may retrieve, from an application server, search ads, and integrate the search ads with the search results. Yahoo! search, which can be seen at Yahoo! Inc.'s website, is one example of a search application. Search application 118 is one example of an application that may be used with the present invention. Other applications, such as a mapping application, may be used in place of, or in addition to, a search application.

As illustrated by FIG. 1, in one embodiment, search application 118 communicates with Web services 140-142. Web services 140-142 represents a variety of services that may provide information or perform actions in response to requests from client devices such as mobile devices 102-104. Such services include, but are not limited to information services, third-party services, audio services, video services, email services, IM services, SMS services, VOIP services, calendaring services, photo services, or the like. These services may provide a variety of content, such as news, stock data, web postings, and the like. The services may also provide individualized services such as banking, financial management, educational services, shopping, and the like. A web service communicating with a search application may, for example, provide search results within a particular domain, provide information relating to each of the search results, provide data that facilitates performing a search, or other services.

Figure 9A:
FIGS. 9A and 9B are pictorial illustrations of client devices showing pages with click action links displayed on the devices.
Figure 9B:

FIG. 1 illustrates an embodiment in which network application gateway 114 communicates with click manager 124. Click manager 124 receives and processes requests that result from a user of a client device, such as mobile device 102-104, selecting an action to be taken. The user selection may be made in response to receiving a page having one or more click action links generated by click action server 116. The selection may appear visually as a component within an advertisement, or on web page, or in a message. Some examples of actions that may be selected are initiating a telephone call, sending an SMS message, requesting to be sent an SMS message, sending an email, requesting to be sent an email, making a purchase, saving information, requesting a coupon, performing a search, and requesting a search be performed. FIGS. 9A-9B illustrate examples of how some of these selections may be presented to a mobile device user. Each of these actions is discussed in further detail below.

Though FIG. 1 illustrates click manager 124 separately from network application gateway 114, some or all of the functions and components of the click manager may be combined and integrated with network application gateway 114 in one or more computing devices. In one embodiment, client device click action selections are sent from a mobile device to click manager 124, without first going to or through network application gateway 114. These and other variations of the system may be employed in accordance with the present invention.

Illustrative Mobile Client Environment

Figure 2:
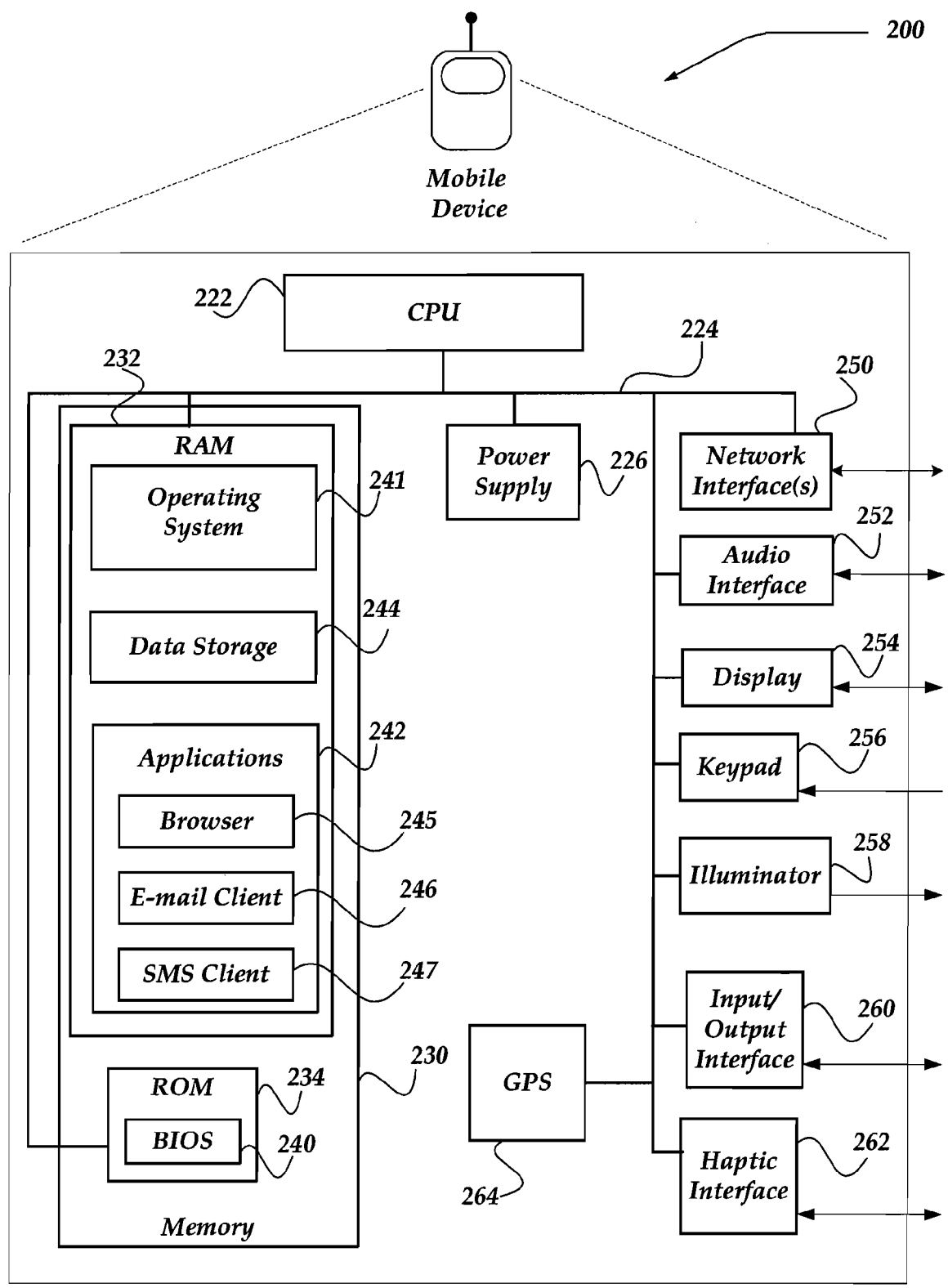
FIG. 2 shows one embodiment of a mobile device that may communicate with a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may, through other components, provide other information that may be employed to determine a physical location of the device, including for example, a MAC address, IP address, or the like.

Mass memory 230 includes a RAM 232, a ROM 234, and other storage means. Memory 230 may include a volatile memory, a non-volatile memory such as flash memory, or both. Memory 230 may include a non-volatile memory that is easily removable by a user. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX®, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage components 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like. Moreover, data storage 244 may also be employed to store a user's personal preferences, such as preferred colors, security parameters, audio preferences, or the like. Some personal preferences may relate to how pages or other information is received and displayed on the display 254. Data storage may also include data that is received from a web site or application and is passed back to the web site or application. This information may be referred to as a "cookie". An HTTP cookie is a cookie that mostly conforms to the HTTP protocol, though a cookie may be in alternate formats and conform to one or more of a variety of communication protocols. At least a portion of the data storage, including personal preferences and cookies may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), audio, video, text, and graphics, and enable telecommunication with another user of another client device. Applications 242 may include one or more browsers 245 and one or more email clients 246. Other examples of application programs include calendars, IM applications, SMS applications, VOIP applications, contact managers, task managers, transcoders, database programs, word processing programs, security applications, spreadsheet programs, games, search programs, and so forth.

Illustrative Network Device Environment

Figure 3:
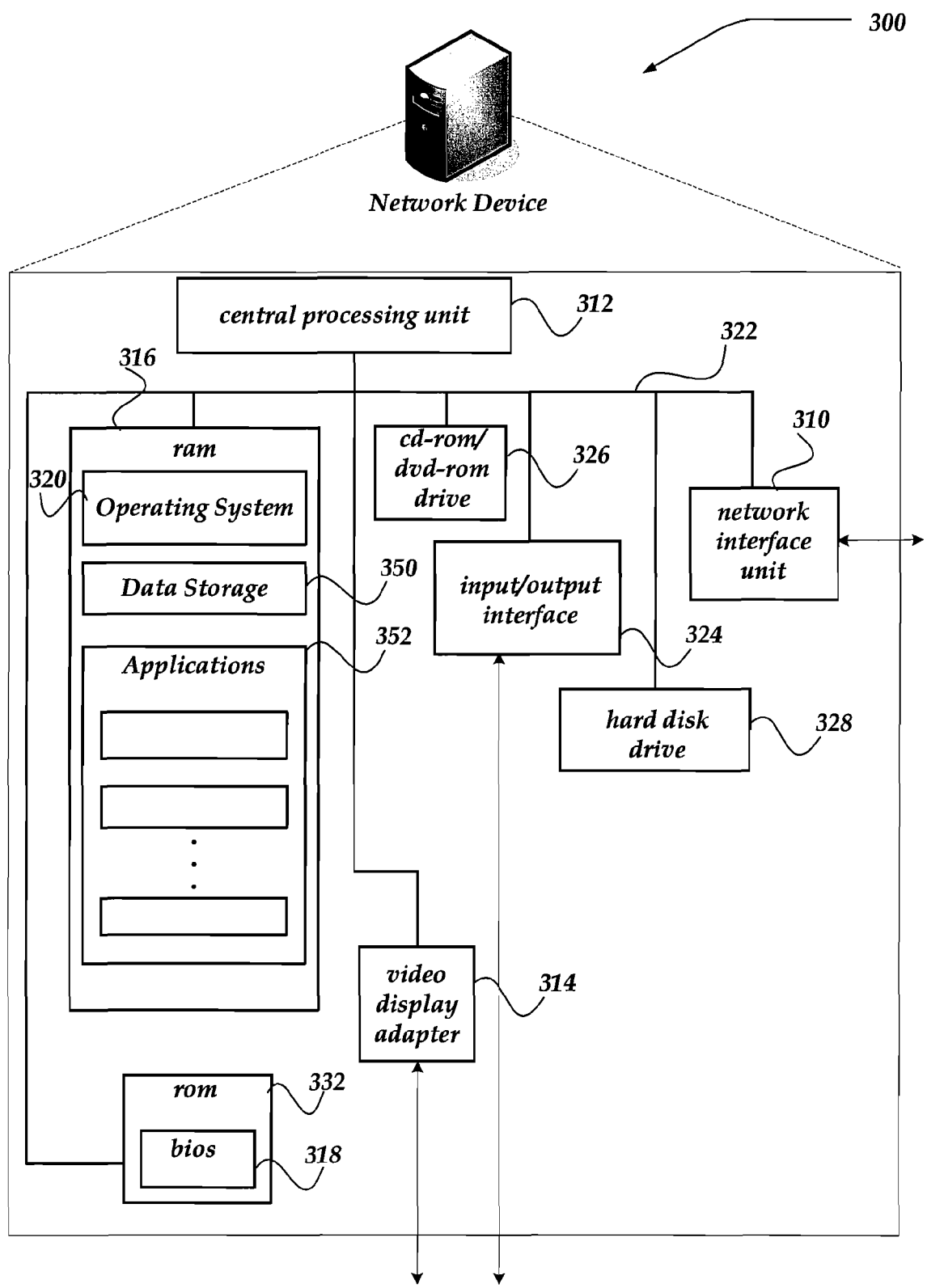
FIG. 3 shows one embodiment of a network device that may be included in a system implementing the invention.

FIG. 3 shows one embodiment of a network device 300, according to one embodiment of the invention. The embodiment of network device 300 illustrated in FIG. 3 may be used to implement the network application gateway 114, banner ad server 112, click action server 116, click manager 124, search application 118, or any of web services 140-142 of FIG. 1. Network device 300 may include many more components than those shown. It may also have less than all of those shown. The components shown, however, are sufficient to disclose an illustrative embodiment for practicing the invention.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Figure 5:
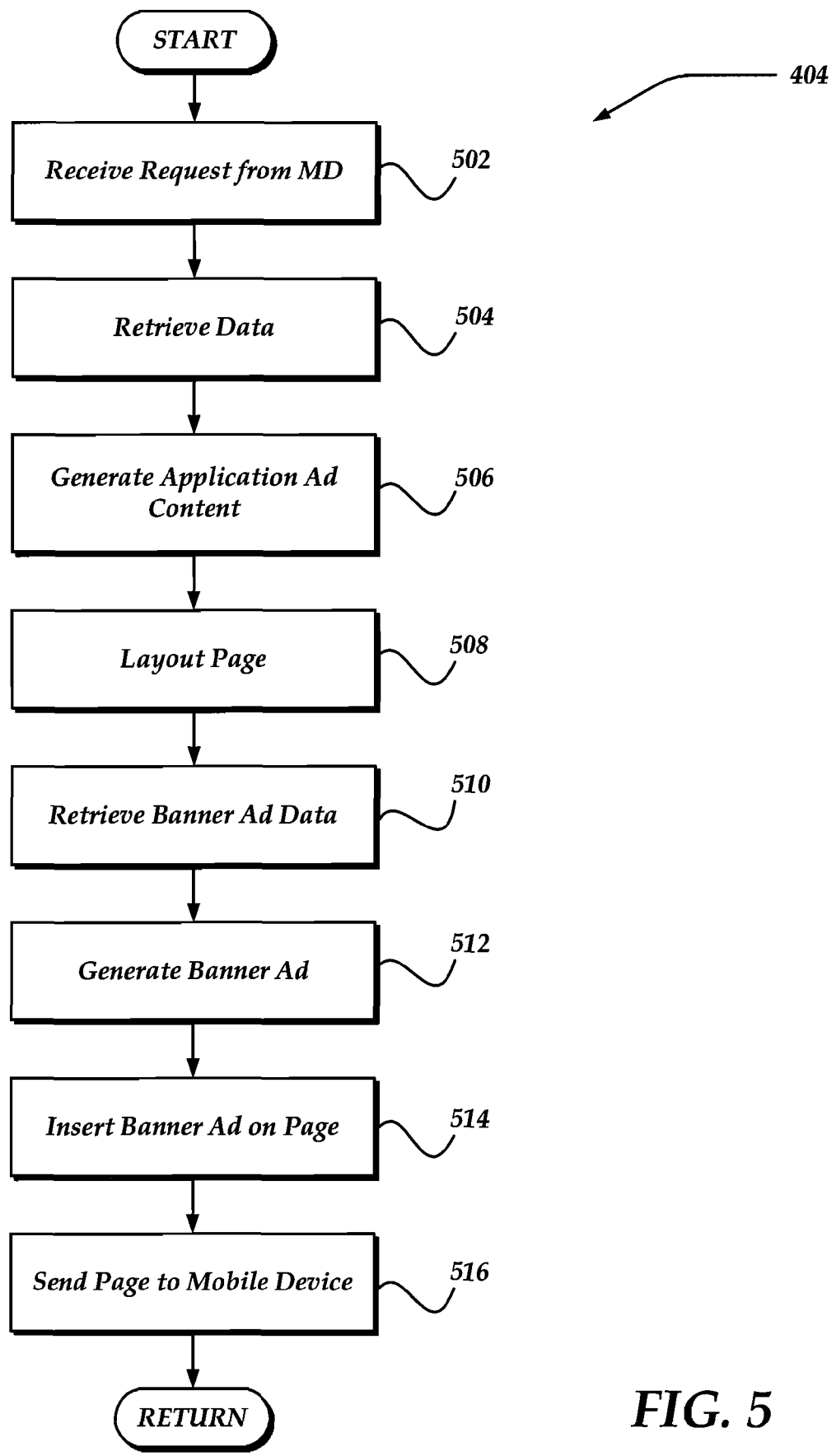
FIG. 5 is a logical flow diagram generally showing one embodiment of a process for delivering advertisements to a client device.
Figure 6:
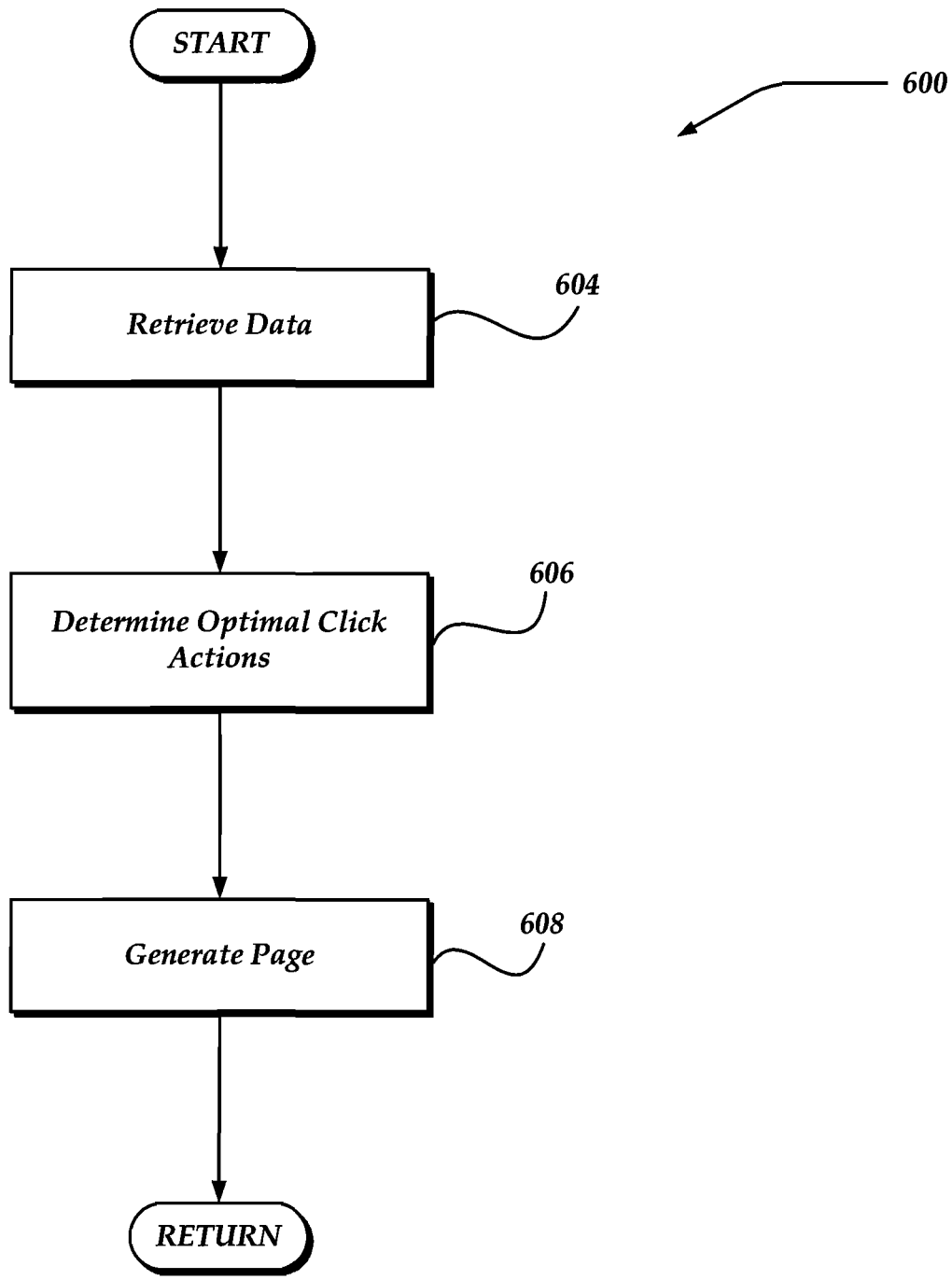
FIG. 6 is a logical flow diagram generally showing one embodiment of a process for determining click actions to send to a client device.

The mass memory also stores program code and data. One or more data storage components 320 may include program code or data used by the operating system 320 or by applications. Data may be stored in ram 316 or other storage devices, such as hard disk drive 328. One or more applications 352 and application components are loaded into mass memory and run on operating system 320. Examples of application programs may include search programs, transcoders, schedulers, calendars, database programs, word processing programs, HTTP programs, customizable user interface programs, IPSec applications, encryption programs, security programs, VPN programs, SMS message servers, IM message servers, email servers, account management and so forth. More detailed discussions of some application programs are included herein. One or more network devices, and the application programs integrated with the devices, may be used to implement the processes of the present invention, as illustrated in FIGS. 5-6 and discussed herein.

Generalized Operation

Figure 4:
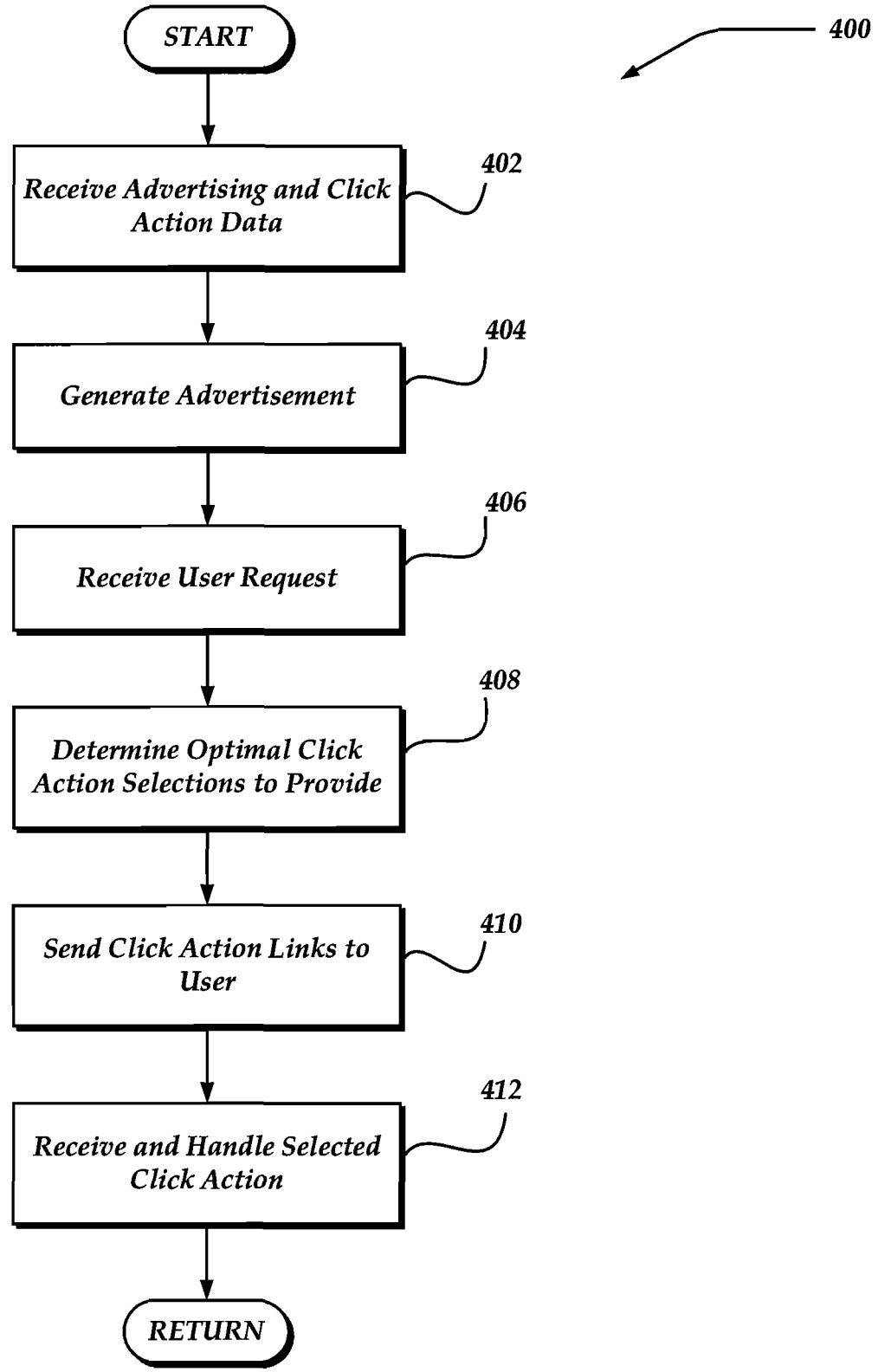
FIG. 4 is a logical flow diagram generally showing one embodiment of a process for monetizing mobile client devices.

FIG. 4 is a high-level flow diagram of a process for providing click action selections and handling click actions in accordance with an embodiment of the invention. Process 404 may employ at least a portion of the system illustrated in FIG. 1. It may employ any of the system variations as discussed herein, or it may be performed with other systems.

The term "click action" refers to the actions corresponding to a selection made by a user of a client device. A click action may be specified in a link, such as a link on a web page. One example of a click action is initiating a telephone call, where the telephone number may be specified in a link that a user may select. Additional examples of click actions are provided below.

After a start block, at block 402, advertising and click action data is received. This may be received from a third party, such as an advertiser, business, or virtually any entity that desires to make use of the invention. This data may include content of ads, specifications of when or where ads are to appear, and the like. The data may also include specifications relating to click actions, including what click actions are desirable to present to users, values assigned to various click actions, constraints on the use of click actions, and data for handling click actions.

At block 404, one or more advertisements are generated and sent to the user's client device. The advertisements may be banner ads, search ads, other types of application ads, or other types of ads. An ad may include a link, a link combined with additional text or images, program code, or other content. The actions of block 404 are illustrated in more detail in FIG. 5 and the accompanying text.

Process flow then proceeds to block 406. At block 406, a request is received from the user's client device, such as mobile device 102-104 of FIG. 1. In one embodiment, this request may be received as a result of a user selecting a link associated with an advertisement. The request may be received as a result of another user action, such as selecting a stored bookmark, another type of selection, or a request sent automatically by a client application. The request may indicate that the user selected a link that is, or is included in the ad. The request may include a URL or URI from a selected link. The request received at block 406 may be an indication that the user desires to initiate, or continue, an interaction, such as an interaction with an advertiser or other entity, or a proxy thereof.

Process flow then proceeds to block 408. At block 408, a determination is made of one or more click actions to present to the user. This determination is made in order to best monetize the interaction with the user. More particularly, it may use information describing the user, the user's client device, the context, and other factors. This determination is described in more detail in FIG. 6 and the discussion that accompanies it, as well as in other parts of this application.

Process flow then proceeds to block 410, where the determined set of one or more click actions are sent to the user's client device. Sending a click action, as used herein, refers to sending a mechanism, such as a link, that provides the receiver with a way to select a click action to be performed. In one embodiment, this is performed by sending, for each click action, a corresponding link to the client device, such that the user may select one of the links.

Process flow then proceeds to block 412, where, in response to a user selection of a click action, an indication of the selected click action is received and handled. This action is described in more detail in FIG. 8.

FIG. 5 is a logical flow diagram generally showing one embodiment of a process 404 for processing and responding to requests from mobile devices. Process 404 of FIG. 5 corresponds to block 404 of FIG. 4, and illustrates at least some details of block 404. Process 404 may employ at least a portion of the system illustrated in FIG. 1. It may employ any of the system variations as discussed herein, or it may be performed with other systems.

Process 404 begins, after a start block, at block 502, where a request is received from a client device, such as mobile devices 102-104 of FIG. 1. The request may have been processed and forwarded by one or more intermediate network devices, such as a network gateway prior to the receipt of the request. In accordance with one embodiment of the invention, the action of receiving the request 502 may be performed by network application gateway 114, or a search application 118. The network application gateway 114 may receive the request 502 and forward it, or a modified request, or a portion thereof, to the search application 114. A request and associated information may be contained within a received message, or may span more than one message.

Process then flows to block 504, where the request is processed. Processing the request may include extracting information from the request, such as a URI or other network address. Extracted information may also include identifying information associated with the mobile device, such as a phone number, email address, location or movement pattern, or a user's identity. Block 504 may also include the retrieval of relevant data from sources other than the request, such as a clock, data storage within the network application gateway, or data storage on other devices. The actions of block 504 may be performed by the network application gateway 114, the search application 118, the application ad server 120, or another component.

Process then flows to block 506, where an application advertisement is generated. This action may include using any one or more of the retrieved information. This action may be performed by application ad server 120, or another component within the system, in response to a communication from search application 118. Generating an advertisement may include one or more of a number of determinations. Some of these determinations may include: determining an advertiser; determining a specific product or advertisement associated with the advertiser; and determining a layout of the advertisement. These determinations may be based on a number of factors, including the current context of the user. The context may include data such as the user's location and movement, recent requests or calls, user preferences, and the like.

The actions of block 506 may be performed to generate one or more application advertisements. Process then flows to block 508, where layout of a page, or a portion of a page, or a message, is performed. An advertisement may be included, for example, in an SMS message sent to a mobile device. Performing a layout of a page may include a determination of where each advertisement is to be located. For example, on a search results page, a search advertisement may be located at the beginning of a list of results, at the end of a list, or embedded in a list.

Process then flows to block 510, where information relevant to determining and generating a banner advertisement is retrieved. This information may include a portion or all of the information used for the determination and generation of the application advertisement; it may include different information, or some combination of the same and different information. The action of block 510 may be performed by the network application gateway 114, the banner ad server 112, or another component.

Process then flows to block 512, where a banner advertisement is generated. This action is similar to the action of block 506, and the discussion of block 506 is applicable to describe block 512. However, due to the use of different criteria, different weighting of criteria, and different ad constraints, the results of block 512 may be different, and typically are different, from the results of block 506. One of the criteria that may differ relates to business constraints. An advertiser may specify whether its ad is to be an application ad or a banner ad, or how frequently its ad is to appear in each of these categories, or even time periods that the ad is to generate for each type of ad.

Process then flows to block 514, where the one or more ads generated at block 512 are inserted in, or combined with, the page, message, or other communication. A number of criteria or constraints may be considered when determining how or where the banner ad is to be combined. A page may, for example, have an associated template that specifies where banner ads are to be located. In one embodiment, an algorithm is employed to determine a banner ad location from among a number of possible locations.

Process then flows to block 516, where the page or message is sent to a client device, such as mobile device 102-104 of FIG. 1. The client device may be the same one that originated the request, or a different one. For example, a device may send a request to send an SMS message to a target mobile device, and the process of the invention generates and inserts one or more ads in the message prior to sending it to the target mobile device. In this example, the request may have been received from a client device other than the target mobile device. A page including an advertisement may be a web page, or other type of page displayed by a client application. A message including an advertisement may be a message such as an SMS message, instant message, or a message employing another protocol . . . . An advertisement may also be sent in an email.

Process 404 then returns to a calling program, and process flow may continue at block 406 of FIG. 4, as discussed above.

FIG. 6 is a logical flow diagram generally showing one embodiment of a process 408 (FIG. 4) for determining click actions to present to a client device. This determination is made in order to best monetize the interaction with the user. Prior to a discussion of process FIG. 6, a discussion of links and click actions follows.

A click action is an action that is associated with a link, and is intended to be performed in response to a user selecting a link. A link may include a reference to a resource, a click action to be performed, a visual element, or some combination of these elements. The term link may refer to the combination of these elements, or to the displayed visual element as a representation of the combination. A visual element may include text, an image, or a combination of text and graphics. One simple link includes text or an image that is displayed on a page, and an associated URL referencing another page. When a user selects the text, program instructions are performed to retrieve the page or document specified in the URL. A link may include an action to be performed, such as initiating a telephone call. The command for initiating the call may be embedded in a URL associated with a link. Any click action discussed herein, such as initiating a call, sending an SMS message or email, or initiating a purchase, as well as other actions, may be specified in a link. The action of generating a page or other content to send to a client device may include the insertion of one or more links in a page or message.

Process 408 begins, after a start block, at block 604, where data is retrieved. This may include data stored at a database, such as ADS database 150 of FIG. 1. The data may include a specification of click actions that are associated with an advertisement or an advertiser, or otherwise may be made available to the user. Each click action may have a corresponding value that is assigned by an advertiser, the system, or other entity. A click action may also have a corresponding probability, indicative of a probability that a user will select the click action. The probability may be incorporated into the value or may be a separate value.

The data retrieved at block 604 may also include data representing the current context, such as the location or movement of the client device, the current date and time, the user identity, recent or historical user actions, or other data associated with the user, the client device, or the environment. The current context may differ for different users, different devices, or the same user and device at different times.

Process flow then proceeds to block 606, where a determination is made of one or more click actions to present to the user. This determination may consider one or more of numerous factors, including the data retrieved at block 604. This determination includes considerations of the values of each possible click action. It may also consider constraints specified for each click action.

A click action's corresponding value may represent the value to an advertiser of having the user perform the action. A click action of "buy now" may have the highest value, since this action results in revenue. A click action of sending a coupon to the client device may have a somewhat lower value, since there is a lower probability that this action will result in an actual purchase and revenue. The value, when considered in conjunction with a probability, may change based on the context. For example, a coupon delivered to a client device when the user is in close proximity to a business may have a higher probability of revenue than a similar coupon delivered when the user is distant from the business, for those businesses where transactions are typically performed in person. For a transaction such as purchasing an item to be downloaded, location may be less of a factor in determining the value of a coupon.

The value of a click action may be based on the type of product that is involved. For example, a click action of "buy now" is unlikely to be valuable for automobiles, since a purchase from a client device is not likely.

Another example of using a current context to determine a click action value is determining the value of a click action of getting directions based on location. If the mobile device is in the region of a business, a link to retrieve directions may have a high value, and be presented to the user. If the mobile device is across the country, links to make a call or send a message may have a higher value, and be presented instead. Similarly, if the time is outside of the business hours, an action of initiating a phone call may have a lowered value, such that a click action of sending an SMS or email is considered a higher value.

Constraints associated with click actions may also be considered when performing the determinations of block 606. An advertiser may specify that a particular click action is only to be presented when specified constraints are met. For example, there may be a constraint to only initiate a phone call during specified times, or to only present a coupon if the client device is close to a specified location.

When determining the value of a click action, and therefore whether it is to be presented, a calculation may be performed that considers one or more factors, weightings assigned to each factor, and other calculations. An advertiser may specify a specific number of click actions to send to the client device. The number of click actions to display may be further influenced by the client device. For example, a device having a small screen may receive less click actions than one with a larger screen. The capabilities of a client device may also serve as a constraint or otherwise affect the value of a click action. A click action of initiating a telephone call has little value on a device that cannot make telephone calls, for example.

Following is a listing of click actions that may be employed with the present invention. An embodiment of the invention may employ any one or combination of these click actions, or additional click actions. For some of the click actions listed below, one or more examples of factors that may affect the corresponding value are described.

Initiate a telephone call. The value of this may be based on a current time or day, such as in relation to business hours. The value may also be based on a system load, such as a number of telephone calls recently initiated, or a number of reservations available at a restaurant.

Call client device. This action may result in a telephone call being made to the client device, either immediately, or some time in the future.

Initiate an SMS message. This click action may send an SMS message to a business or to the client device. The value of an SMS message may be inversely based on the value of a telephone call. It may be presented, for example, as a substitute to a telephone call. Initiating messages other than SMS, such as instant messages, may have similar characteristics.

Initiate an email. This click action may initiate an email to a business or to the client device or user account. The value of an email may be based on an amount of information, or the richness of the information format, to send. The amount of information may be predetermined, or it may be dynamically determined based on current context or other data.

Buy now. The value of this click action may be based on whether the user has an account that can be charged, a history of purchases by the user, and the like.

Search. A click action for search may request, for example, a search of local stores in proximity of the user's mobile device. The value of this click action may be based on the mobile device's location, the time, and other data.

Save. A click action of "save" may be based on whether the user has already saved the desired information, and other data.

SMS session. This click action initiates an SMS conversation between the client device and a remote computing device. In one embodiment, a click action handler receives and sends SMS messages to the client device.

It is to be understood that the invention is not limited to these or other examples described herein. The determination of a value corresponding to a click action, and therefore a determination of which click actions to present to a user of a client device, may be based on any one or more factors, such as described herein.

After determining the set of one or more click actions to present to a user, process flows to block 608, where a page or message is generated. Process flow then returns to a calling program, such as action block 408 of FIG. 4.

Figure 7:
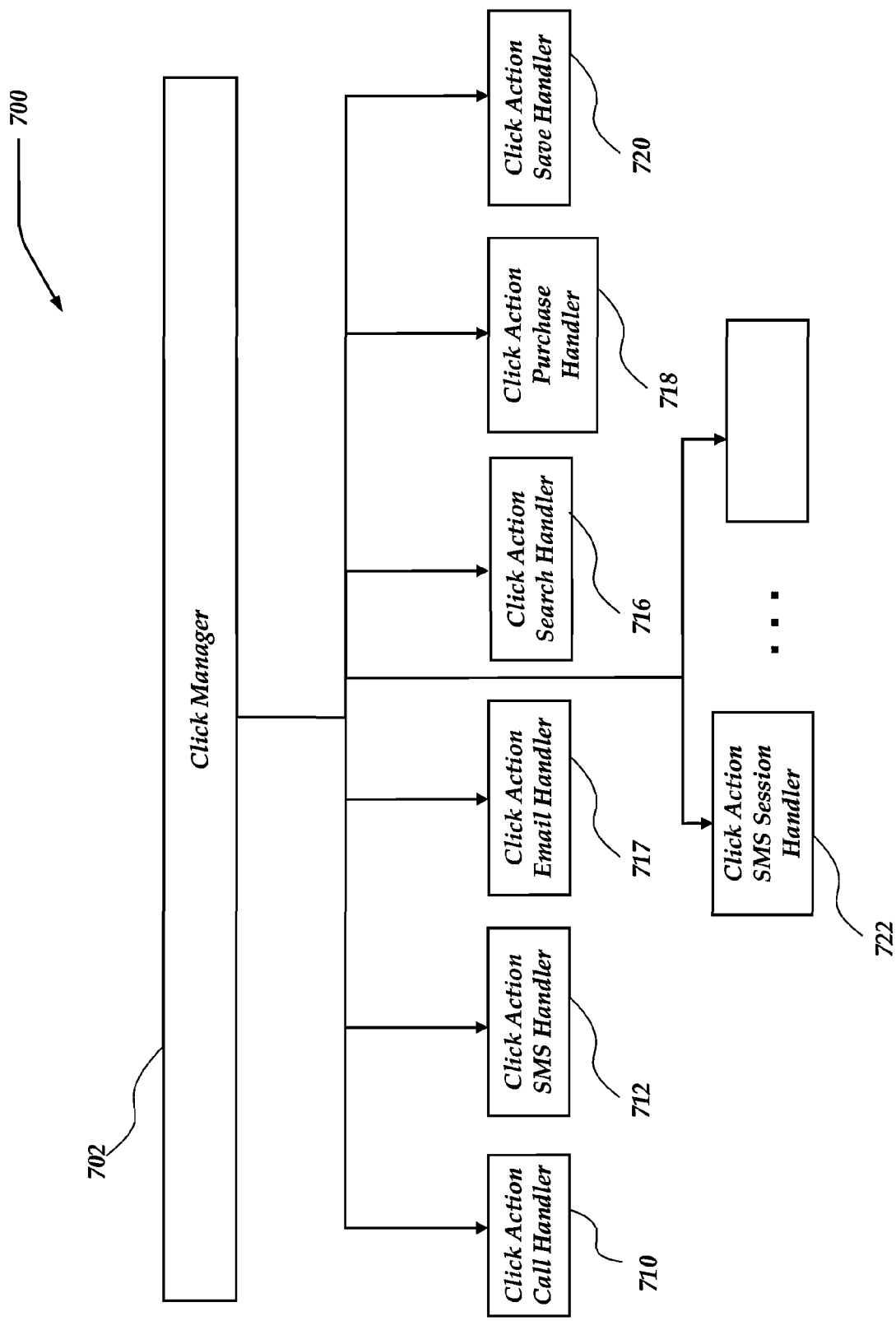
FIG. 7 is a block diagram of one embodiment of a system for processing user selections received from a client device.

FIG. 7 is a block diagram of selected components of a system for handling click actions, in accordance with an embodiment of the invention.

In one embodiment, at least some of the components of FIG. 7 may be applications that are included in the applications 352 of the network device of FIG. 3. In various configurations, the components of FIG. 7 may be arranged in various ways on one or more network devices, and may be replicated one or more times. In one embodiment, the click manager 702 resides within a network device such as click action server 116 of FIG. 1, and each of the click action handlers 710-722 resides on a separate network device.

Click manager 702 receives click action requests, and manages the processing of each request. It may process the request, determine the request type, and forward the request to a click action handler, based on the determination. This process is discussed in further detail in the text accompanying FIG. 8.

Figure 8:
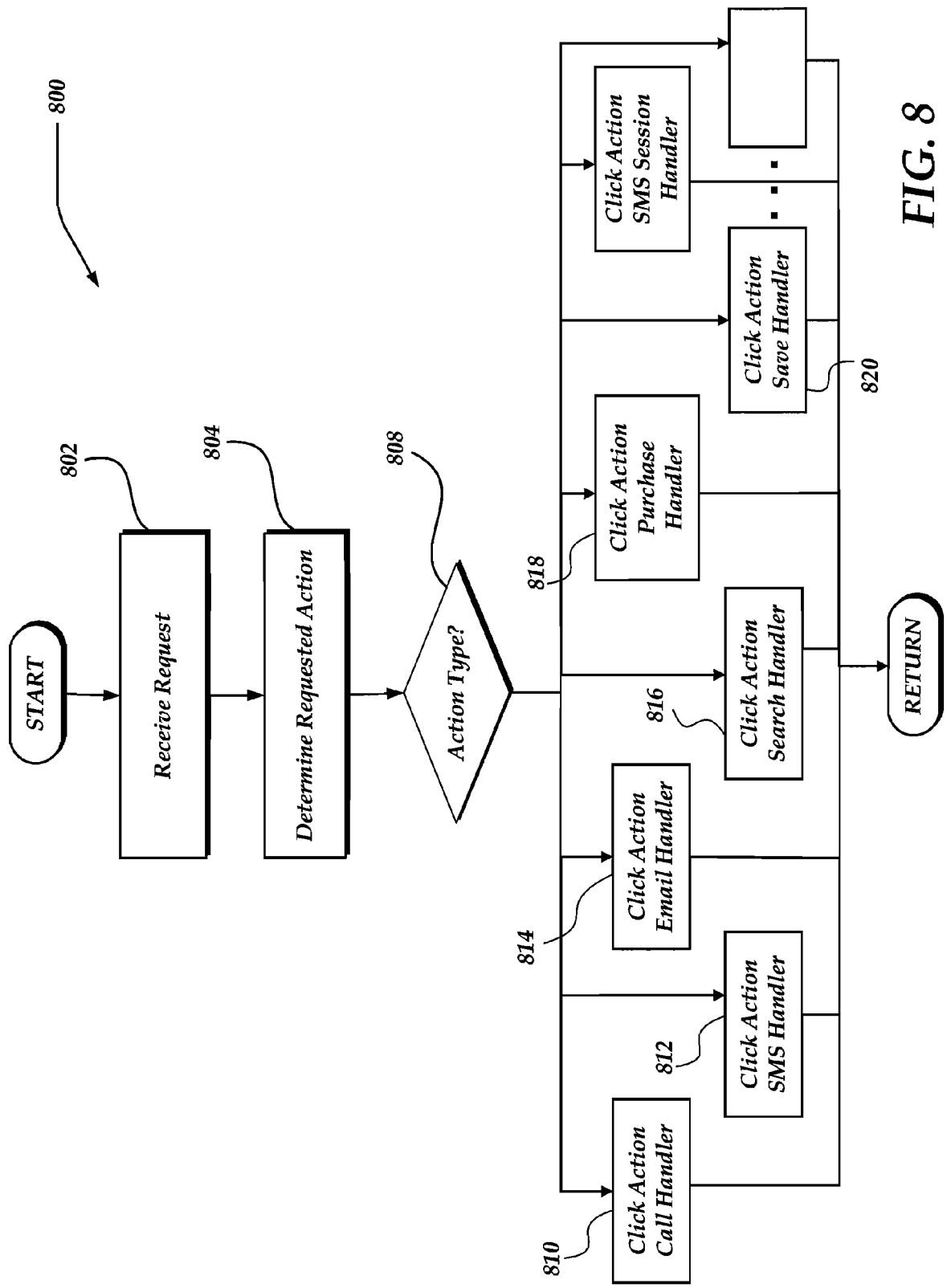
FIG. 8 is a logical flow diagram generally showing one embodiment of a process for processing user selections received from a client device.

FIG. 8 and the associated text herein describe the functions and operation of each of the click action handlers 710-722. Therefore, following is a brief listing of these components.

Click action call handler 710 processes click action call requests.

Click action SMS handler 712 processes click action SMS requests.

Click action email handler 714 processes click action email requests.

Click action search handler 716 processes click action search requests.

Click action purchase handler 718 processes click action purchase requests.

Click action save handler 720 processes click action save requests.

Click action SMS session handler 722 process click action SMS session requests.

As illustrated in FIG. 7, additional click action handlers may be included to handle additional click actions not described herein.

FIG. 8 is a logical flow diagram generally showing one embodiment of a process for processing and responding to click action selections from a client device. A user may select a click action by selecting a link corresponding to the click action. The link may be included in a web page, an email, a message such as an SMS message, instant message, or a message employing another protocol, or virtually any item displayed by a client application. The client device extracts the link reference, and uses this to send a request or command. The request or command typically includes a specification of the click action to be performed. The specification may be explicit or implicit in the request. As used herein, the term request includes a command.

Process 800 of FIG. 8 may employ at least a portion of the system illustrated in FIG. 1. It may employ any of the system variations as discussed herein, or it may be performed with other systems.

Process 800 begins, after a start block, at block 802, where a request is received from a client device, such as mobile devices 102-104 of FIG. 1. The request may have been processed and forwarded by one or more intermediate network devices, such as a network gateway, prior to the receipt of the request. In accordance with one embodiment of the invention, the action of receiving the request 802 may be performed by click manager 702 of FIG. 7. A request and associated information may be contained within a received message, or may span more than one message.

Process then flows to block 804, where a determination is made of the type of click action that is indicated by the request. This determination may include extracting information from the request, such as a URI or other network address. The actions of block 804 may be performed by click manager 702 of FIG. 7, or another component.

Process then flows to block 808. At block 808, the request and associated information are forwarded to a click action handler such as one of click action handlers 710-722 of FIG. 7. Decision block 808 and the process branches flowing from it illustrate differing actions that may occur, based on the click action specified in the request. In one embodiment, each type of action is handled by a corresponding click action handler.

If the click action is an outgoing telephone call, process flow proceeds to block 810, where an instruction is sent to the mobile device to initiate a telephone call. The instruction may include a telephone number to be called. A click action call handler 710 (FIG. 7) may communicate with a data store, such as ADS database 150 of FIG. 1, to retrieve the target telephone number, as well as any other data needed to place the telephone call.

If the click action is receiving an SMS message, process flow proceeds to block 812, where an SMS message is sent to the mobile device. A click action SMS handler 712 (FIG. 7) may communicate with a data store, such as ADS database 150 of FIG. 1, to retrieve the content of the SMS message, as well as any other data needed to complete sending of the SMS message. In one embodiment, a click action of sending an SMS message is handled similarly to this, except that the user specifies a phone number of another mobile device, and an SMS message is sent to the other mobile device. In one embodiment, a click action SMS alert may register the mobile device to receive SMS alerts when a specified event occurs. The event could be virtually any event that the advertiser specifies. When the event occurs, an associated SMS message is sent to the mobile device.

If the click action is receiving an email message, process flow proceeds to block 814, where an email message is sent to the mobile device. A click action email handler 714 (FIG. 7) may communicate with a data store, such as ADS database 150 of FIG. 1, to retrieve the content of the email message, as well as any other data needed to complete sending of the email message. In one embodiment, the click action email handler 714 communicates with the client device to request an email address, and sends an email to the address returned by the user. This is useful if, for example, the email to be sent is large or richly formatted and it is preferable to be read at a computer with a larger screen.

If the click action is performing a search, process flow proceeds to block 816, where a search is initiated by a click action search handler 716 (FIG. 7). The click action search handler 716 may perform a search or communicate with a network device such as a web service to perform the search. In one embodiment, a search may be performed on data in a data store, such as ADS database 150 of FIG. 1. For example, the action may be one of searching for a local store, and the information on the stores is in the ADS database. The click action search handler 716 may also communicate with the ADS database 150 or other data store to retrieve any other data needed to complete the search. The results of the requested search may be sent to the mobile device as a web page, an SMS message, email, or another type of message.

If the click action is purchasing an item, process flow proceeds to block 818, where a click action purchase handler 718 (FIG. 7) performs the purchase. The click action purchase handler 718 may communicate with a data store, such as ADS database 150 of FIG. 1, to retrieve product information, as well as any other data needed to complete the transaction. The click action purchase handler may communicate with a network device, such as a web service, to perform at least a portion of the transaction. In one embodiment, performing a purchase includes the use of an electronic wallet or similar mechanism that includes credit card information, an account number, or other mechanism for handling payments. In one embodiment, a click action of "add to shopping cart" may be processed by adding an item to a user's shopping cart. At a later time, the user may log in to an account from a mobile device or another client device to complete the purchase transaction. The action of block 818 may include sending a confirmation or a receipt to the client device, in the form of a web page, an SMS message, or email, or to the user at a designated email address.

If the click action is save, process flow proceeds to block 820, where a click action save handler 720 (FIG. 7) performs the specified action. A save action causes a specified information to be saved in a user account, a personal web page, or other network-based storage controlled by, or accessible to, a user. A user viewing an ad may desire to save information relating to the ad, such as text, an image, a URL, a photo, or other type of information. This information may be available for retrieval by the user at a later time, from the mobile device or virtually any computing device. It may also be available for retrieval by other users. The click action save handler 720 may communicate with a data store, such as ADS database 150 of FIG. 1, to retrieve product information, or other data to be stored. The click action save handler may communicate with a network device, such as a web service or other server, to perform at least some of the processing to complete the save action.

If the click action is an SMS session, process flow proceeds to block 822, where a click action SMS session handler 722 (FIG. 7) initiates an SMS session with the requesting client device. The SMS session handler 722 may include logic to send to and receive SMS messages from the client device.

Additional click actions, not illustrated in FIG. 8, may also be handled. A receive call click action may initiate an automated call to the client device or instruct a person to call the client device. A directions click action may invoke a directions handler to communicate with a web service to retrieve a map or directions to a specified location from the location of the mobile device. It may retrieve the location of the mobile device from a GPS component or other location component in the device. A coupon click action may invoke a coupon handler to retrieve a coupon from the ADS database 150, and send it to the mobile device, as a web page or in an email. The coupon may have a bar code or other code that can be scanned or read by a store clerk, for example.

After processing the click action, the process flows to a return block, and may return to a calling program or receive another request.

FIGS. 9A and 9B are pictorial illustrations of client devices with screens displaying pages in accordance with the present invention. The client devices in each figure are mobile devices, such as mobile devices 102-104 of FIG. 1 or mobile device 200 of FIG. 2. Each page includes links having corresponding click actions, as discussed herein. Mobile device 902 includes a screen 904 showing a page 906 sent to the user in response to the user clicking on an advertisement. Page 906 includes a coupon link 908, which has an associated click action of receiving a coupon. The coupon may be sent to the mobile device in a web page, an email, or another mechanism. Call link 910 has an associated click action of initiating a telephone call. In this example, the telephone number to be called is displayed as the visual element of the link. Other text or images may also be used as the visual element of the link. For example, a graphic of a telephone may indicate a telephone call. Directions link 912 has an associated click action of receiving directions, a map, or both. In this example, the text "get directions" is the visual element of the link.

Mobile device 920 includes a screen 922 showing a page 924 sent to the mobile device in response to the user clicking on an advertisement. Page 924 includes an SMS link 926, with an associated click action of receiving an SMS message. In this example, the SMS message would include a coupon. Search link 928 has a corresponding click action of performing a search. In this example, the search is for a list of stores in the local geographic region.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method of employing a processor to enable actions for managing different types of click actions for a client device, the actions comprising:
   sending an advertisement to the client device;
   receiving a response to the advertisement from the user;
   in response to receiving the response to the advertisement:
      retrieving data associated with a current context for a location factor and a time constraint for the client device;
      determining a set of at least one of a plurality of different types of click actions to be provided to the client device, based on the retrieved data associated with the current context for the location factor, and the time constraint for the client device and a magnitude of a value that corresponds to a type for each click action;

sending a set of at least one link to the client device for display separate from the received advertisement and without having the set of at least one link displayed in a page, wherein each of the set of at least one link corresponding to a click action of the determined set of at least one type of click action;

receiving a request from the client device based on a selection of at least one link, the request including a specification of at least one click action of the set of at least one type of click action that corresponds to the selected link; and performing the at least one specified click action.

2. The method of claim 1, wherein determining the set of at least one type of click action is performed in response to receiving a request from the client device indicating that an advertisement has been selected.

3. The method of claim 1, wherein determining the set of at least one type of click action comprises determining a value for each of a first type of click action and a second type of click action, and selectively including the first type of click action based on the values for each of the first type of click action and the second type of click action.

4. The method of claim 1, wherein determining the set of at least one type of click action comprises determining a value for each of a first type of click action and a second type of click action based on data associated with the client device, and selectively including the first type of click action based on the values for each of the first type of click action and the second type of click action.

5. The method of claim 1, further comprising providing to an advertiser a mechanism for facilitating communication with the client device of at least one item selected from a group consisting of a telephone call, an SMS message, or an email message.

6. The method of claim 1, further comprising providing to an advertiser a mechanism for specifying criteria for determining the set of at least one type of click action.

7. The method of claim 1, wherein the set of at least one type of click action includes at least one type of click action selected from the group consisting of initiating a telephone call, sending a message, and sending an email.

8. The method of claim 1, wherein the set of at least one type of click action includes at least one type of click action selected from the group consisting of performing a search, retrieving directions, purchasing an item, and storing information associated with a user account.

9. The method of claim 1, wherein the set of at least one type of click action includes sending a message to the client device, the message including advertiser information, and wherein performing the at least one click action comprises sending the message to the client device.

10. The method of claim 9, wherein the message is an SMS message or an email.

11. A system for managing communications with a client device, comprising:

a transceiver to send and receive data over the network; and
a processor that is operative to perform actions, including:
sending an advertisement to the client device;
receiving a response to the advertisement from the user;
in response to receiving the response to the advertisement:
determining a set of at least one of a plurality of different types of click actions based on a current context for a location factor, and a time constraint for the client device and a magnitude of a value that corresponds to a type for each click action;

sending a set of links for display separate from the received advertisement and without having the set of at least one link displayed in a page, each link representative of a click action of the determined set of at least one type of click action to the client device;

receiving a request from the client device based on a selection of at least one link, wherein the request includes a selection of at least one click action of the set of at least one type of click action that corresponds to the selected link from the client device; and performing the selected at least one click action.

12. The system of claim 11, the actions further comprising determining a value corresponding to each of a plurality of types of click actions, and wherein the set of at least one type of click action is selected from the plurality of different types of click actions based on the determined values.

13. The system of claim 11, wherein determining the set of at least one type of click action is based on at least one constraint associated with at least one of the plurality of different types of click actions.

14. The system of claim 11, further comprising a click manager that performs click actions in response to click action selections received from the client device.

15. A non-transitory processor readable storage medium of executable instructions that enable actions by a processor for facilitating a communication with a user of a mobile device, the actions comprising:

sending an advertisement to the client device;
receiving a response to the advertisement from the user;
in response to receiving the response to the advertisement:
providing a mechanism for a third party to specify a set of different types of click actions to provide to the user;
determining, based on a current context for a location factor, and a time constraint for the mobile device and a magnitude of a value that corresponds to a type for each click action, a subset of the set of different types of click actions, the subset including at least one type of click action of the set of different types of click actions;
sending a click action for display separate from the received advertisement and without having the set of at least one link displayed in a page and corresponding to each of the subset of the determined set of different types of click actions to the user;
receiving from the user at least one click action that corresponds to at least one of the subset of click action types; and
performing the corresponding at least one click action.

16. The non-transitory processor readable storage media of claim 15, wherein the third party is an advertiser.

17. The non-transitory processor readable storage media of claim 15, wherein determining the subset of the set of different types of click actions is based on a monetization value of each type of click action of the set of different types of click actions.

18. The non-transitory processor readable storage media of claim 15, wherein determining the subset of the set of different types of click actions comprises determining a value for each of a first type of click action and a second type of click action, and selectively including the first type of click action based on the values for each of the first type of click action and the second type of click action.

19. A system for facilitating a communication with a user of a mobile device, comprising at least one server having a processor, the at least one server performing the actions of claim 15.

\* \* \* \* \*